April 21, 1925.

B. JEROME

HEADLAMP SUPPORT

Filed Dec. 26, 1923

1,534,715

Inventor
Benjamin Jerome
By his Attorneys
Blackmore, Spencer & Flint

Patented Apr. 21, 1925.

1,534,715

UNITED STATES PATENT OFFICE.

BENJAMIN JEROME, OF PONTIAC, MICHIGAN, ASSIGNOR TO GENERAL MOTORS CORPORATION, OF DETROIT, MICHIGAN, A CORPORATION OF DELAWARE.

HEADLAMP SUPPORT.

Application filed December 26, 1923. Serial No. 682,696.

*To all whom it may concern:*

Be it known that I, BENJAMIN JEROME, a citizen of the United States, and a resident of Pontiac, county of Oakland, and State of Michigan, have invented certain new and useful Improvements in Headlamp Supports, of which the following is a full, clear, concise, and exact description, such as will enable others skilled in the art to which the invention relates to make and use the same, reference being made therein to the accompanying drawings, which form a part of this specification.

This invention relates to lamp supports, and is illustrated as embodied in an automobile having a pair of head lamps supported by novel brackets which are adjustably connected by a cross-tie member which braces the lamps and fenders.

An object of the invention is to provide a construction of this character which is neat in appearance and which is capable of adjustment but which will brace the lamps and fenders rigidly.

In one desirable arrangement, the lamps are supported by novel brackets carried by the fenders which have convex upper surfaces and which are provided with openings through which clamping bolts extend adjustably to secure the lamps on said surfaces, the lamps and fenders being braced by a cross member of novel form secured thereto and extending in front of the radiator. In the particular arrangement shown in the drawings, each bracket is provided with a projection beyond its lamp supporting portion which is embraced by one end of a channel-shaped cross member to which it is adjustably secured.

The above and other objects and features of the invention will be apparent from the following description of the illustrative embodiments shown in the accompanying drawings, in which Fig. 1 is a front elevation of part of an automobile showing the fenders and radiator and lamps with the novel lamp supporting means;

Figure 1:
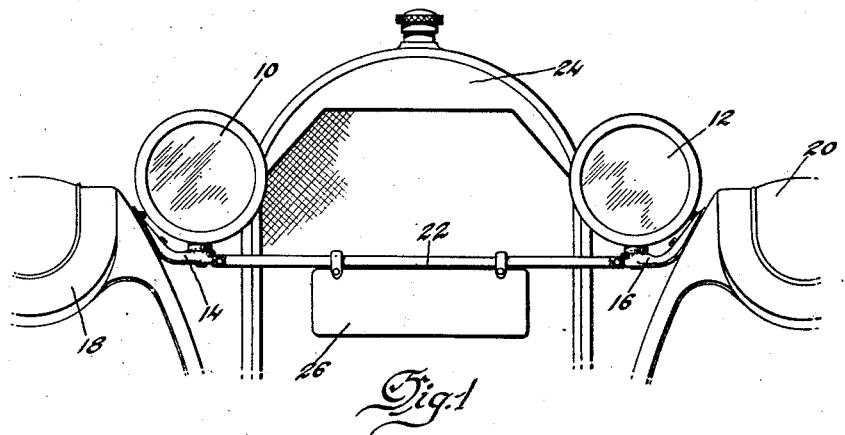

In the arrangement selected for illustration, the lamps 10 and 12 are supported respectively on novel brackets 14 and 16, each of which is secured to one of the fenders 18 and 20, which brackets are connected by a cross-tie member or brace 22 extending in front of the radiator 24. If desired, a license plate 26 may be supported on the cross member in the usual manner.

Figure 4:
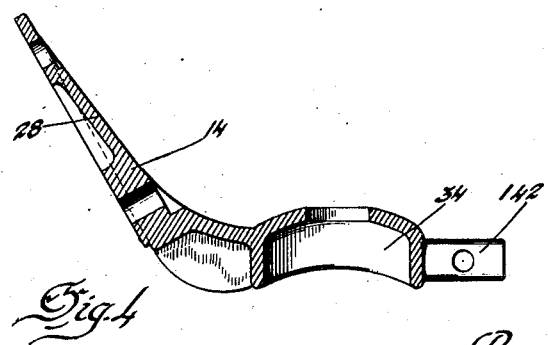
Fig. 4 is a longitudinal vertical section through a modified form of the novel lamp supporting bracket.

According to the present invention, each of the brackets 14 and 16 has an upwardly extending portion 28 clamped by bolts 30 and 32 to the corresponding fender and has a horizontally extending portion 34 which supports the corresponding lamp. As will be apparent from Figs. 2 and 4, this portion has a convex upper surface with a relatively large opening in its apex through which extends a clamp bolt 36, the head of which is held in the usual manner between a part of the lamp and an internal boss formed in the lamp supporting post or bracket 38, which is riveted or otherwise secured to the lamp. This bolt clamps the concave lower surface of the lamp supporting post 38 against portion 34 in such a manner as to permit of adjustment in any direction to provide for accurate location of the lamp. The nut 40 threaded on the clamp bolt 36 is preferably concealed in a socket or hollow formed in the horizontal portion 34 of the bracket, as will be apparent from Fig. 2.

Figure 2:
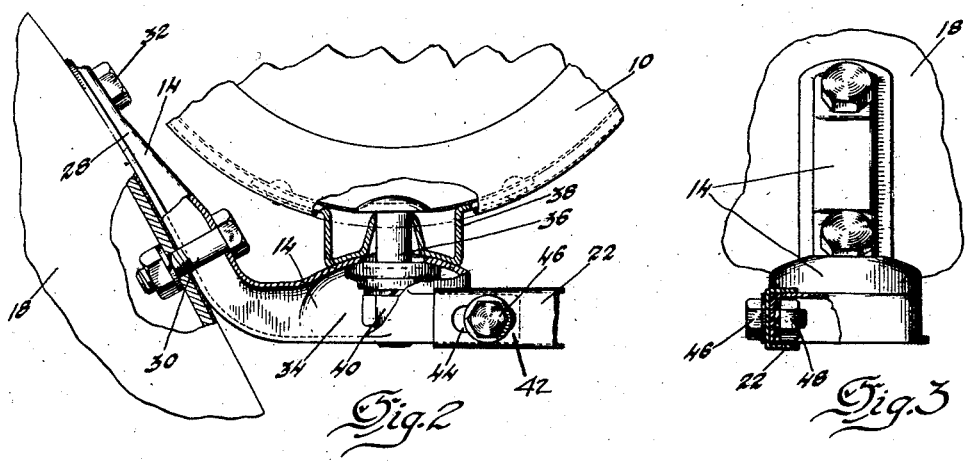
Fig. 2 is an enlarged view, partly broken away, of part of a fender and a corresponding lamp, together with the bracket for supporting the lamp and part of the cross-tie member secured thereto.
Figure 3:
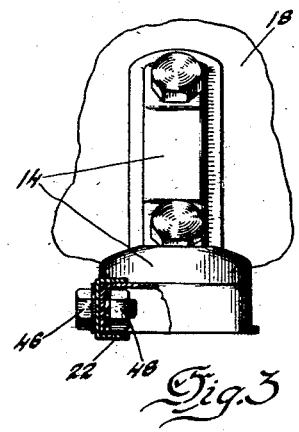
Fig. 3 is a side elevation of the part shown in Fig. 2 looking from the right toward the left but with the lamp removed.

Preferably, the brackets 14 and 16 are connected by the brace member 22 in such a manner as to permit of adjustment, and as one convenient manner of providing such an adjustment, this cross member is shown as being channel-shaped (Figs. 2 and 3) and embracing at its opposite ends hollow projections or lugs 42 formed on the brackets beyond the lamp supporting portions. The cross-tie member 22 is shown as having slots 44 at its opposite ends through which extend bolts 46 held by nuts 48 concealed inside of the hollow or recess in the projection 42. In the form shown in Fig. 4, the lug 142, corresponding to lug 42 in Fig. 2, is solid.

While one particular embodiment of my invention has been illustrated and described, it is not my intention to limit its scope to that embodiment or otherwise than by the terms of the appended claims.

I claim:

1. An automobile having, in combination, a pair of fenders, a bracket connected to each fender and having a convex upper surface, a cross-tie adjustably connecting the brackets, a lamp having a concave lower socket resting on the bracket, and means to clamp each lamp to its bracket.

2. An automobile having, in combination, a fender, a bracket secured to the fender and provided with a horizontally extending portion having a convex upper surface with a relatively large opening at its apex, a cross-tie bracing member extending horizontally and connected to the horizontal portion of said bracket, a lamp having a supporting portion with a concave lower surface resting on the convex portion of said bracket, and a clamping bolt secured to the lamp and extending through the opening in such a manner as to be movable in the opening to adjust the position of the lamp.

3. An automobile having, in combination, a pair of fenders, a bracket secured to each fender provided with a horizontally extending lamp supporting portion having a convex upper surface and a horizontal projection beyond said portion, a lamp adjustably supported on the convex portion of each bracket, and a channel-shaped tie member embracing said projections at its opposite ends and secured thereto.

4. An automobile having, in combination, a pair of fenders, a bracket secured to each fender provided with a horizontally extending lamp supporting portion having a convex upper surface and a horizontal projection beyond said portion, a lamp adjustably supported on the convex portion of each bracket, a channel-shaped cross-tie member embracing said projections at its ends and provided with slots adjacent said projections, and clamping bolts extending through the slots into said projections adjustably to secure the channel-shaped member to the brackets to brace the fenders and the lamps.

5. A lamp supporting bracket for an automobile having a portion extending upwardly at an angle and arranged to be secured to a fender, a generally horizontal portion having a convex lamp supporting upper surface, and a projection beyond the lamp supporting portion to be secured to a fender bracing cross-tie member.

6. An automobile having, in combination, a fender, a bracket having a portion extending upwardly at an angle which is secured to said fender, a horizontally extending portion having a convex upper lamp supporting surface and which has a recess on its lower side, a lamp supported on said surface provided with a clamping bolt extending through the bracket, and a nut on the bolt for clamping the lamp in position which is concealed in said recess.

In testimony whereof I affix my signature.

BENJAMIN JEROME.